US005379030A

United States Patent [19]

Nolan et al.

[11] Patent Number: 5,379,030

[45] Date of Patent: Jan. 3, 1995

[54] USER FRIENDLY CHANNEL SELECTION IN A SELECTIVE CALL RECEIVER AND METHOD THEREFOR

[75] Inventors: Thomas R. Nolan, Deerfield Beach; Mark T. Stair, Delray Beach, both of Fla.; Patrick S. Kung, Taipei, Taiwan, Prov. of China

[73] Assignee: Motorola, Inc., Schaumburg, Ill.

[21] Appl. No.: 919,675

[22] Filed: Jul. 27, 1992

[51] Int. Cl.[6] ................................ H04Q 7/00

[52] U.S. Cl. .................... 340/825.03; 340/825.44; 455/158.5; 455/191.1

[58] Field of Search ................ 340/825.44, 825.27, 340/825.03; 455/158.5, 351, 191.2, 191.1, 89

[56] References Cited

U.S. PATENT DOCUMENTS

| | | | |
|---|---|---|---|
| 4,713,808 | 12/1987 | Gaskill et al. | 370/94.1 |
| 5,001,775 | 3/1992 | Hayashi et al. | 455/158 |
| 5,087,905 | 2/1992 | Kuramatsu et al. | 340/825.44 |
| 5,152,012 | 9/1992 | Schwob | 455/158.5 |

*Primary Examiner*—Donald J. Yusko
*Assistant Examiner*—Edward Merz
*Attorney, Agent, or Firm*—Gregg Rasor

[57] ABSTRACT

A selective call receiver (100) comprising an information display (118) and a processor (106) operationally coupled to the information display (118). The information display (118) presents at least information representing an area map (402) with a plurality of operating regions (403, 404, 405) in which the selective call receiver can receive an information signal from a selected channel. Each region in the plurality of operating regions (403, 404, 405) corresponds to a predetermined selective call signaling channel that may be selected for operation by activating at least one user activated control (407). The at least one user activated control (407) is operationally coupled to the processor (106) for effecting selection and reception of the information signal on the channel associated with the selected region on the information display (118).

12 Claims, 4 Drawing Sheets

100

USER FRIENDLY CHANNEL SELECTION IN A SELECTIVE CALL RECEIVER AND METHOD THEREFOR

FIELD OF THE INVENTION

This invention relates in general to selective call receivers and more particularly to a selective call receiver having a symbolic radio frequency channel selector for effecting operation of the selective call receiver on a selected radio frequency channel.

BACKGROUND OF THE INVENTION

Radio communication systems typically use a receiver (e.g., a selective call receiver or "pager") that has at least one unique call address. These radios receive and decode an address, then typically alert the user to the presence of incoming information and operate to present this information. Radio communication systems are an excellent vehicle for delivering voice, numeric, alphanumeric or coded information to a user.

Most contemporary selective call radio receivers employ a crystal controlled single frequency oscillator as a conversion signal source. Some contemporary "high-end" selective call radio receivers use a crystal controlled, microcontroller programmed frequency synthesizer as a conversion signal source. These high-end receivers allow for a more flexible environment in manufacturing and distributing dissimilar frequency models of a selective call radio receiver because a manufacturer needs to stock only one or two master frequency crystals. This scenario is not without its problems, as each microcontroller and its accompanying frequency synthesizer must be programmed by the manufacturer for proper operation. If a user desires to use their selective call radio receiver in a number of regions across a geographic area, the receiver must be frequency agile, that is, capable of changing its receive channel frequency. This is necessary because typically, Radio Common Carriers cannot always arrange for like channel frequencies across a wide geographic area.

Attempts have been made to solve the preceding problem by adding pre-programmed frequency selection to conventional two-way radios via direct channel entry selection (e.g., entering a frequency) and "alias" channel selection (e.g., Channel A corresponds to 152.48 MHz, Channel B corresponds to 161.5 MHz, etc.). All of these methods require a user to have intimate knowledge of the system that their receiver is operating in to select the correct channel for reception. This drawback cannot be overcome without completely redesigning the operating systems to accommodate automatic frequency selection and direction such as in a conventional cellular telephone system.

Consequently, what is needed is a simplistic method and apparatus that allows a user to easily select a correct operating channel frequency when operating their selective call radio receiver in a plurality of geographical areas.

SUMMARY OF THE INVENTION

Briefly, according to the invention, there is provided a selective call receiver comprising an information display and a processor operationally coupled to the information display. The information display presents at least information representing an area map with a plurality of operating regions in which the selective call receiver can receive an information signal from a selected channel. Each region in the plurality of operating regions corresponds to a predetermined selective call signaling channel that may be selected for operation by activating at least one user activated control. The at least one user activated control is operationally coupled to the processor for effecting selection and reception of the information signal on the channel associated with the selected region on the information display.

Implemented in the selective call receiver is a method comprising presenting information representing an area map having a plurality of operating regions in which the selective call receiver can receive the information signal from a selected channel, each region in the plurality of operating regions having a corresponding predetermined selective call signaling channel. The method further comprises selecting one of the plurality of operating regions and the corresponding predetermined selective call signaling channel as the selected channel and operating the selective call receiver on the selected channel to receive the information signal.

DESCRIPTION OF PREFERRED EMBODIMENT

Figure 1:
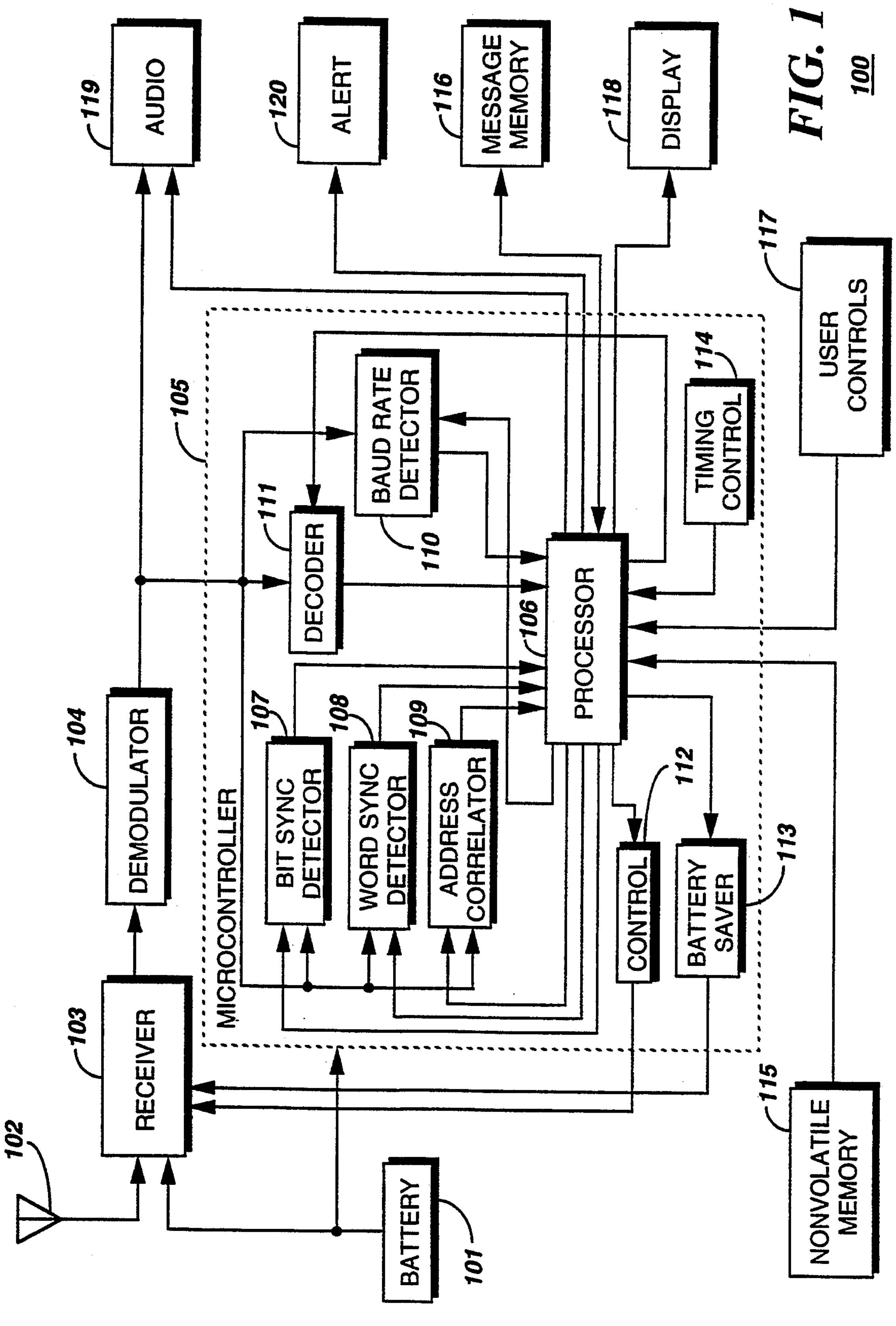
FIG. 1 is a block diagram of a selective call receiver in accordance with the present invention.

Referring to FIG. 1, a battery 101 powered selective call receiver 100 operates to receive an information signal via an antenna 102. A receiver 103 couples a converted received information signal to a conventional demodulator 104 that is capable of recovering analog or digital information. Received digital information is recovered by the demodulator as a serial bit stream. The serial bit stream is then coupled to a microcontroller 105 for interpreting and decoding combinations of bits as address, control, and data signals. In the preferred embodiment, the microcontroller 105 may comprise a processor 106, a bit synchronization detector 107, a word synchronization detector 108, an address correlator 109, a baud rate detector 110, a data decoder 111, a control circuit 112, a battery saver 113, and a timing control 114, implemented in hardware, software, or a combination thereof. Examples of commercially available microcontrollers suitable for implementing the preferred embodiment of the present invention are Motorola's MC68HC05xx or M68HC11xx. Complete descriptions of these devices are available in Motorola's data book set entitled "Microprocessor, Microcontroller, and Peripheral Data," volumes I and II, Series A, © 1988 by MOTOROLA, INC.

More specifically, in the microcontroller 105 the serial bit stream is coupled to the baud rate detector 110 that determines a receiving data rate associated with the recovered information. When the receiving data rate is determined, the bit synchronization detector 107 establishes synchronization between the microcontroller's 105 data decoding components (106, 109, and 111) and the individual signals (e.g., address, control, and data signals) in the recovered information. Once bit synchronization is established, the word synchronization detector 108 searches the serial bit stream for information indicating the beginning of a batch or frame. When the microcontroller 105 has established both bit and word synchronization, the recovered information may be searched for a group identification code associated with the selective call receiver. When a group identification code is found corresponding to the selective call receiver, it will search only those code frames associated with the receiver's group for pages intended for the selective call receiver. During the period between like frames, the microcontroller 105 will preferably "shutdown" the receiver 103 and demodulator 104, thereby conserving battery power. The interval between like frames is known in the art as a "sleep" period. If the system protocol is designed such that pages targeted for a specific group identifier, and pages intended for a particular selective call receiver are sent only during the transmission of that receiver's group, no pages are missed during the sleep period. A receiver that operates in the fashion discussed above is said to be operating in a "battery saving" mode.

In determining the selection of the particular selective call receiver, a correlation is performed between a predetermined address associated with the selective call receiver and a received address. To accomplish this, the address correlator 109, which comprises a signal processor, correlates a received address with the predetermined address or addresses stored in the selective call receiver's non-volatile memory 115 or code plug. Optionally, the non-volatile memory 115 may reside inside a support integrated circuit (not shown) or in the microcontroller 105. The non-volatile memory 115 typically has a plurality of registers for storing a plurality of configuration words that characterize the operation of the selective call receiver. When a valid correlation of the received address with the predetermined address associated with the selective call receiver occurs (the addresses correlate), the microcontroller 105 may in a tone-only mode activate an alert 120. Alternatively, in response to a valid data address correlation, the decoder 111 operates to decode at least one selective call message from the received information signal and couples message information to the message memory 116.

In accordance with the recovered information, and settings associated with the user controls 117, the selective call receiver presents at least a portion of the message information, such as by a display 118 or an audio section 119, and signals the user via an audible, visual, or tactile alert 120 that a message has been received. The user may view information that is automatically presented on the display 118 or manually presented in response to activating the appropriate user controls 117.

The microcontroller 105 may also include items such as a conventional signal multiplexer, a voltage regulator and control mechanism, a current regulator and control mechanism, environmental sensing circuitry such as for light or temperature conditions, audio power amplifier circuitry, control interface circuitry, and display illumination circuitry. These elements are arranged in a known manner to provide an information receiver as requested by a customer.

Figure 2:
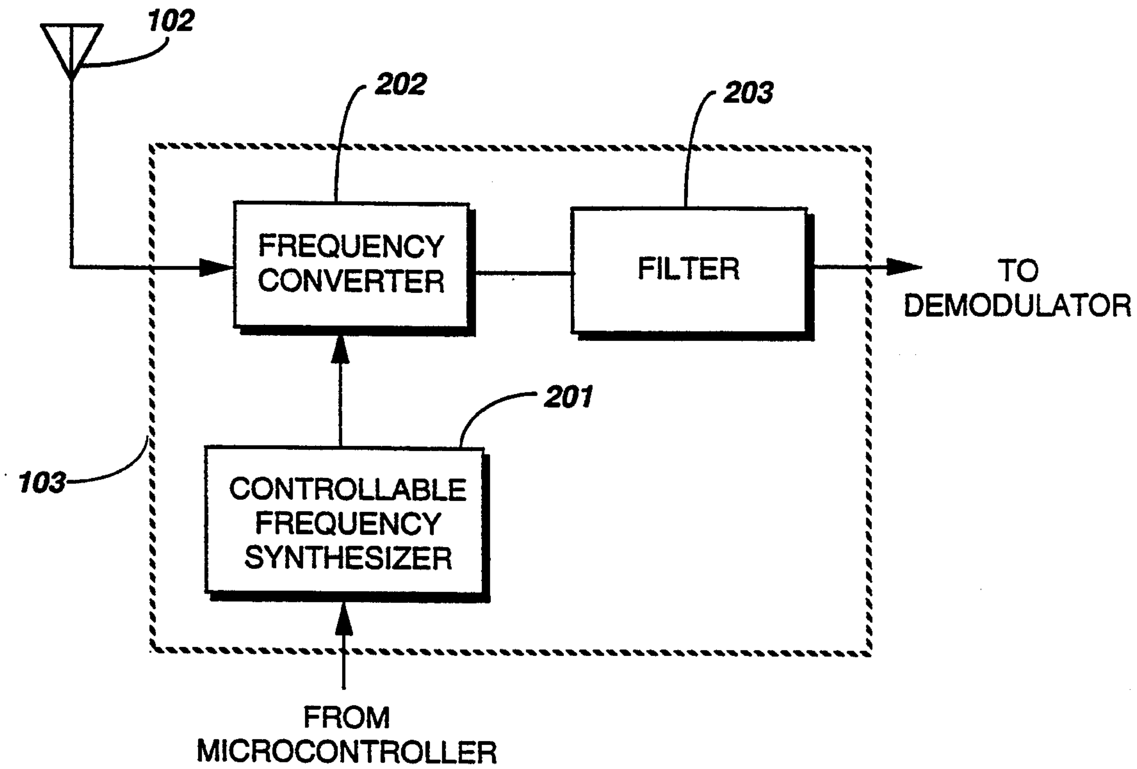
FIG. 2 illustrates an exemplary implementation of a synthesized receiver configured for operation in accordance with the preferred embodiment of the present invention.

Referring to FIG. 2, the illustration shows an exemplary implementation of a synthesized receiver configured for operation in accordance with the preferred embodiment of the present invention. The synthesized receiver 103 comprises a conventional controllable frequency synthesizer 201 that generates a local oscillator signal used by a conventional frequency converter 202 to convert the information signal received by the antenna 102 to the converted received information signal that is then selectively filtered by a filter 203 and coupled to the conventional demodulator 104 that is capable of recovering analog or digital information. The controllable frequency synthesizer 201 is operationally coupled to the microcontroller 105 and its associated processor 106 via the control circuit 112 for allowing the microcontroller 105 to selectively program the operating frequency of the frequency synthesizer 201.

Figure 3:
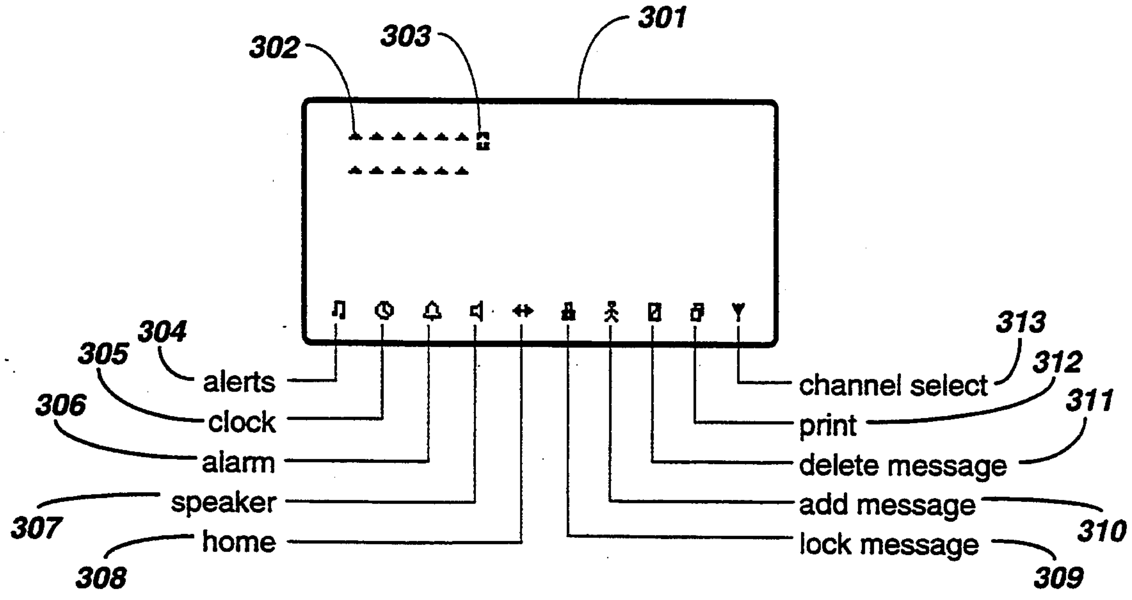
FIG. 3 illustrates an information display screen layout in accordance with the preferred embodiment of the present invention.

Referring to FIG. 3, the illustration shows an information display screen layout 301 in accordance with the preferred embodiment of the present invention. The filled triangles are received message symbols 302 that represent message slots (information storage "bins") that contain information received by the selective call receiver. The inverse highlighted filled triangle 303 represents the position of the active message pointer. By executing a read operation sequence (e.g., navigating to a message icon then selecting the read function control switch), a selective call message can be presented on the information display in response to activation of a user control for selecting presentation of the at least one selective call message on the information display.

The function indicators 304, 305, 306, 307, 308, 309, 310, 311, 312, 313, are arranged in a menu format below the message slot display lines. These function indicators represent actions that can be performed on information within the selective call receiver. The indicators are grouped by function into read and status modes. The read mode function indicators 308, 309, 310, 311, 312 are used to control the disposition of messages received by the selective call receiver. In this embodiment, read mode function indicators include message locking 309, message addition 310, message deletion 311, and print message 312. The status mode function indicators 304, 305, 306, 307, 308, 313 are used to access and alter operational parameters associated with intrinsic functions within the selective call receiver. In this embodiment, status mode function indicators include alert selection 304, clock configuration 305, alarm configuration 306, speaker control 307, and operating channel selection 313. The home function indicator 308 is shared by both the read and status modes.

Figure 4:
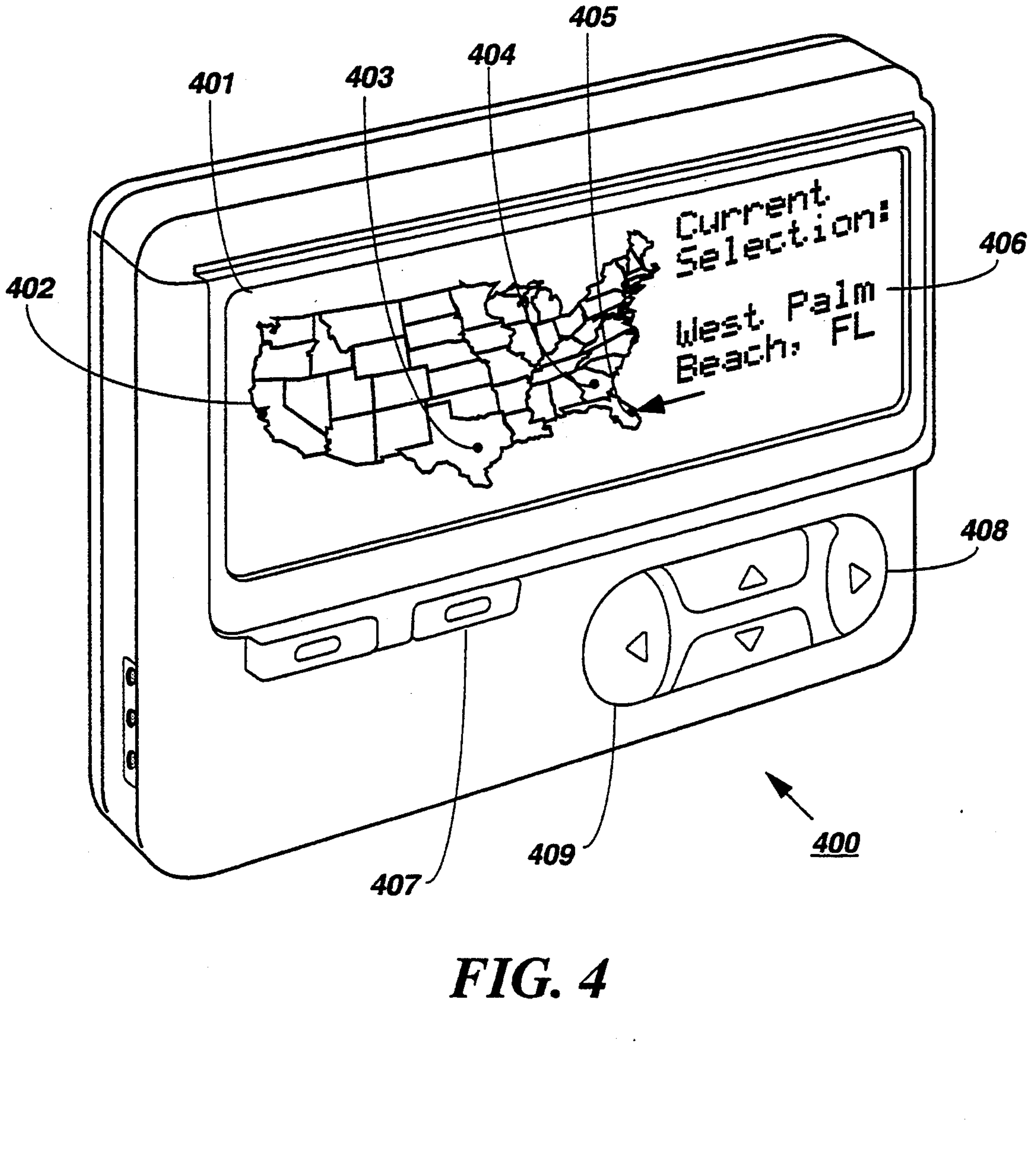
FIG. 4 illustrates a perspective view of the selective call receiver in FIG. 1 while operating in a channel selection mode in accordance with the preferred embodiment of the present invention.

Referring to FIG. 4, the illustration shows a perspective view of the selective call receiver in FIG. 1 while operating in a channel selection mode in accordance with the preferred embodiment of the present invention. The selective call receiver 400 comprises an information display 401 for presenting information representing an area map 402 having a plurality of operating regions 403, 404, 405 in which the selective call receiver can receive the information signal from a selected channel. The information display 401 further may present information representing a current active region 406 for selection, the current region being denoted by the graphical symbol (e.g., arrow on the map) and the accompanying text describing the region (e.g., Current Selection: West Palm Beach, FL).

Each region in the plurality of operating regions 403, 404, 405 has a corresponding predetermined selective call signaling channel that carries the information signal including selective call messages intended for reception by the user's receiver. To implement selection of one of the plurality of operating regions 403, 404, 405 and the corresponding predetermined selective call signaling channel as the selected channel, a processor 106 is operationally coupled to the information display and to at least one user activated control 407, 408, 409. In response to selecting of one of the plurality of operating regions, the processor 106 allows the microcontroller 105 to selectively program the operating frequency of the frequency synthesizer 201, thereby effecting operation of the selective call receiver on the selected channel to receive the information signal. The user may navigate among the displayed regions using right 408 and left 409 arrow keys. In a more elegant implementation, the user may navigate directly to a region by depressing the arrow key pointing to a corresponding direction of movement desired.

As discussed in the background, previous attempts have been made to solve the problem of operating a selective call receiver in a diverse wide area mode while maintaining "user friendly" operational characteristics. Prior art pre-programmed frequency selection, such as in conventional two-way radios, is mostly limited to either direct channel entry selection (e.g., entering a frequency) or "alias" channel selection (e.g., Channel A corresponds to 152.48 MHz, Channel B corresponds to 161.5 MHz, etc.). Each of these methods require intimate knowledge of the system in which a user's receiver is operating. The preferred embodiment of the present invention eliminates any need for familiarity with the radio operating system, protocol, or service provider. A user can easily configure their receiver for operation in any authorized geographical region simply by selecting the region.

Figure 5:
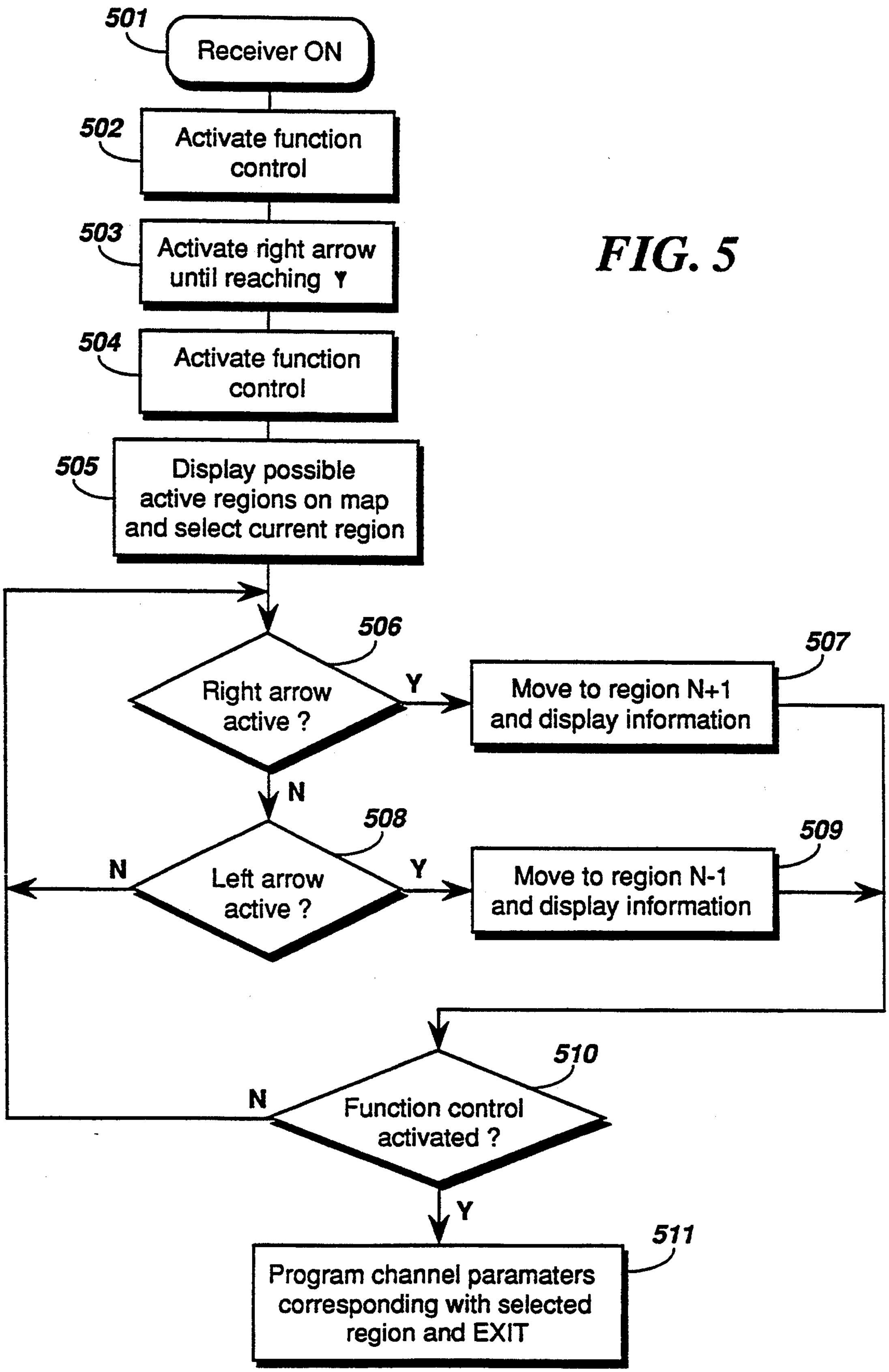
FIG. 5 is a flow diagram that illustrates operation of the channel selection mode in accordance with the preferred embodiment of the present invention.

Referring to FIG. 5, a flow diagram illustrates operation of the channel selection mode in accordance with the preferred embodiment of the present invention. Operationally, the selective call receiver 100 is in an ON state 501. To initiate geographic channel selection, a user activates a function (user) control 502 that displays the function indicators 304, 305, 306, 307, 308, 309, 310, 311, 312, 313 shown in FIG. 3. To enter the mode where the information display 401 presents information representing an area map 402 having a plurality of operating regions 403, 404, 405, the user activates 503 the right arrow control 408 until reaching the channel select symbol 313. When the user has reached the channel select symbol 313, the user activates the function control again 504 to present information representing an area map, a current selected channel and its corresponding region, and other possible active regions for selection 505.

To select one of the plurality of operating regions and the corresponding predetermined selective call signaling channel as a selected channel, the user may activate either the right 506 or left 508 arrow controls. Depending on which control the user activates, the information display 401 presents information representing a next current active region for selection 507 or a previous current active region for selection 509, each new current region being denoted by the graphical symbol (e.g., arrow on the map) and the accompanying text describing the region (e.g., Current Selection: West Palm Beach, FL) as shown in FIG. 4. When a desired region of operation is found, the user again activates the function control 510, thereby programming the selective call receiver with the correct channel parameters for the selected region and commencing operation on the selected channel for receiving the information signal.

What is claimed is:

1. A selective call receiver for receiving an information signal, the selective call receiver comprising:
   - an information display for presenting information representing an area map having a plurality of operating regions in which the selective call receiver can receive the information signal from a selected channel, each region in the plurality of operating regions having a corresponding predetermined selective call signaling channel; and
   - a processor operationally coupled to the information display and to at least one user activated control for selecting one of the plurality of operating regions and the corresponding predetermined selective call signaling channel as the selected channel, and in response to selecting of one of the plurality of operating regions, operating the selective call receiver on the selected channel to receive the information signal.

2. The selective call receiver according to claim 1 comprising:
   - a receiver capable of receiving and converting the information signal to a converted received information signal that is demodulated for recovering data comprising selective call signaling and message information.

3. The selective call receiver according to claim 2 further comprising:
   - an address correlator responsive to an address signal present in the selective call signaling information, the address correlator generating a valid correlation when the address signal correlates with a predetermined address associated with selecting the selective call receiver.

4. The selective call receiver according to claim 3 further comprising:
   - a decoder for decoding at least one selective call message from the message information in response to the valid correlation of the address signal with the predetermined address associated with selecting the selective call receiver.

5. The selective call receiver according to claim 4 wherein the information display is capable of presenting the at least one selective call message in response to activation of a user control for selecting presentation of the at least one selective call message on the information display.

6. In a selective call receiver for receiving an information signal, a method comprising the steps of:
   - presenting information representing an area map having a plurality of operating regions in which the selective call receiver can receive the information signal from a selected channel, each region in the plurality of operating regions having a corresponding predetermined selective call signaling channel;
   - selecting one of the plurality of operating regions and the corresponding predetermined selective call signaling channel as the selected channel; and
   - operating the selective call receiver on the selected channel to receive the information signal.

7. The method according to claim 6 further comprising the steps of:
   - receiving the information signal;
   - converting the received information signal to a converted received information signal;

demodulating the converted received information signal; and recovering data comprising selective call signaling and message information from the demodulated converted received information signal.

8. The method according to claim 7 further comprising the step of generating a valid correlation when an address signal present in the selective call signaling information correlates with a predetermined address associated with selecting the selective call receiver.

9. The method according to claim 8 further comprising the step of decoding at least one selective call message from the message information in response to the valid correlation of the address signal with the predetermined address associated with selecting the selective call receiver.

10. The method according to claim 9 further comprising the steps of:

activating a user control for selecting presentation of the at least one selective call message on the information display; and presenting the at least one selective call message on the information display in response to activation of the user control.

11. A selective call receiver for receiving an information signal, the selective call receiver comprising:

a receiver capable of receiving and converting the information signal to a converted received information signal that is demodulated for recovering data comprising selective call signaling and message information;

an address correlator responsive to an address signal present in the selective call signaling information, the address correlator generating a valid correlation when the address signal correlates with a predetermined address associated with selecting the selective call receiver;

a decoder for decoding at least one selective call message from the message information in response to the valid correlation of the address signal with the predetermined address associated with selecting the selective call receiver;

an information display for presenting information representing an area map having a plurality of operating regions in which the selective call receiver can receive the information signal from a selected channel, each region in the plurality of operating regions having a corresponding predetermined selective call signaling channel; and a processor operationally coupled to the information display and to at least one user activated control for selecting one of the plurality of operating regions and the corresponding predetermined selective call signaling channel as the selected channel, and in response to selecting of one of the plurality of operating regions, operating the selective call receiver on the selected channel to receive the information signal.

12. The selective call receiver according to claim 11 wherein the processor is operationally coupled to a user control that selects presentation of the at least one selective call message on the information display, and in response to activation of the user control, presenting the at least one selective call message on the information display.

* * * * *